United States Patent
Naka

(10) Patent No.: US 8,988,397 B2
(45) Date of Patent: Mar. 24, 2015

(54) DISPLAY CONTROL APPARATUS FOR CONTROLLING DISPLAY RESPONSIVE TO TOUCH INPUT, DISPLAY CONTROL METHOD, AND STORAGE MEDIUM

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 13/019,016

(22) Filed: Feb. 1, 2011

(65) Prior Publication Data

US 2011/0193808 A1  Aug. 11, 2011

(30) Foreign Application Priority Data

Feb. 5, 2010 (JP) ................................. 2010-024021

(51) Int. Cl.
*G06F 3/041* (2006.01)
*G06F 3/043* (2006.01)

(52) U.S. Cl.
CPC .................... *G06F 3/0418* (2013.01)
USPC ..... 345/178; 345/173; 178/18.01; 178/18.02; 178/18.03

(58) Field of Classification Search
CPC ....... G06F 3/041; G06F 3/0418; G01C 17/38; G01C 21/00
USPC ..................... 345/173, 178; 178/18.01–18.04
See application file for complete search history.

(56) References Cited

U.S. PATENT DOCUMENTS 6,456,952 B1 *  9/2002  Nathan ........................... 702/94
2008/0150909 A1 *  6/2008  North et al. ................... 345/173

FOREIGN PATENT DOCUMENTS

JP        10-116155        5/1998

* cited by examiner

*Primary Examiner* — Kenneth Bukowski
(74) *Attorney, Agent, or Firm* — Cowan, Liebowitz & Latman, P.C.

(57) ABSTRACT

A display control apparatus which can prevent calibration caused by a user's erroneous operation in normal use, and correct for a coordinate deviation beyond the scope of assumption. Transformation of touch input is performed to obtain detected coordinates using a transformation coefficient. When the detected coordinates are obtained inside a first range defined in advance, the detected coordinates are obtained as calibration coordinates. When the detected coordinates are obtained outside the first range, the relationship between the previous detected coordinates and the present detected coordinates is obtained, and whether or not the relationship satisfies a specific condition determined in advance is determined. When the number of times the specific condition is satisfied reaches a predetermined number of times, a plurality of detected coordinates obtained outside the first range are obtained as calibration coordinates. A calibration process is performed to update the transformation coefficient based on the calibration coordinates.

12 Claims, 10 Drawing Sheets

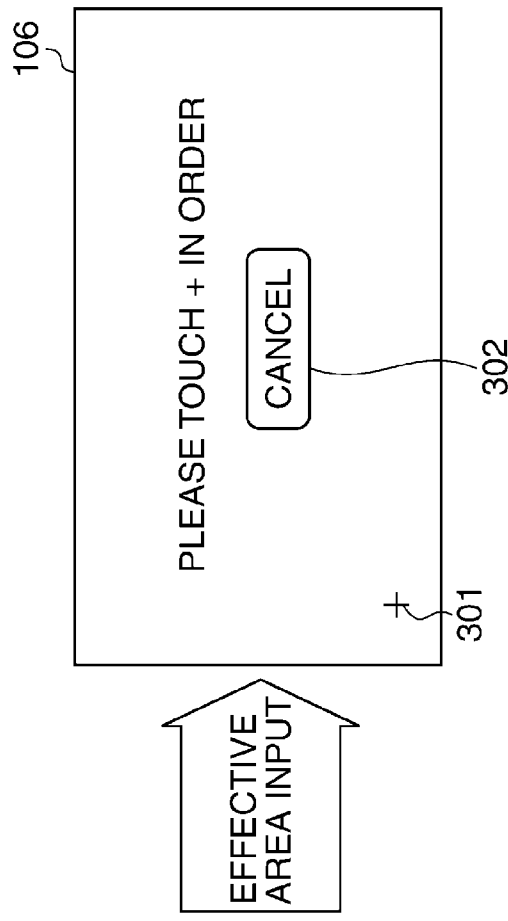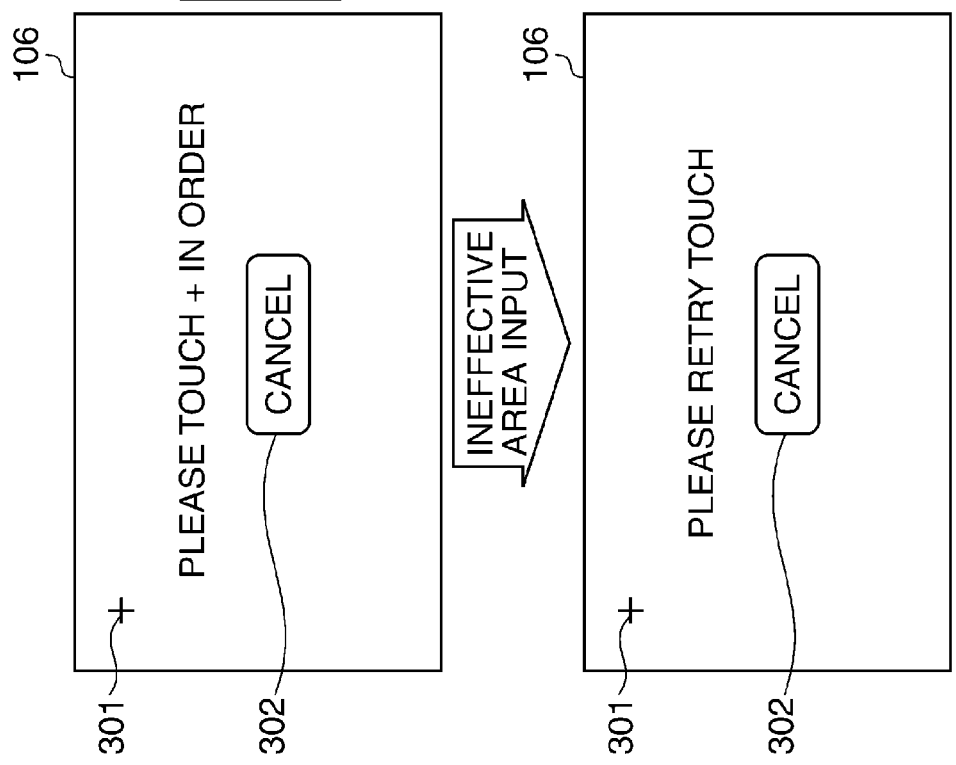
FIG.3A / FIG.3B / FIG.3C

DISPLAY CONTROL APPARATUS FOR CONTROLLING DISPLAY RESPONSIVE TO TOUCH INPUT, DISPLAY CONTROL METHOD, AND STORAGE MEDIUM

BACKGROUND OF THE INVENTION

1. Field of the Invention

The present invention relates to a display control apparatus for controlling display responsive to touch input, a display control method, and a storage medium, and in particular, to a display control apparatus that corrects for a deviation between an input position (input coordinates) and a display position (that is, coordinates) of touch input, a display control method, and a computer-readable storage medium storing a program for causing a computer to implement the method.

2. Description of the Related Art

In general, there are known electronic devices or systems which produce displays using an input means such as a touch panel. Also, user interfaces using an application that enables intuitive input operations through touch input from a touch panel or the like have been developed.

In such electronic devices using touch input from a touch panel or the like, a deviation between target coordinates on a display screen and detected coordinates when touch input is done correctly at the target coordinates (a coordinate deviation) occurs due to factors such as user's parallax or age deterioration.

To correct for such a coordinate deviation, the electronic devices or the like are equipped with a so-called calibration menu (hereinafter also referred to as the calibrating function). Users can correct for a coordinate deviation using the calibration menu.

However, in a case where the calibrating function is used, when a user makes an error in a calibrating operation, it may be impossible to accurately operate the device through touch input.

To prevent such an inconvenience, for example, it has been known that calibration results are checked (see, for example, Japanese Laid-Open Patent Publication (Kokai) No. H10-116155).

According to Japanese Laid-Open Patent Publication (Kokai) No. H10-116155, the center of a display screen is displayed as a contact position. Then, when a user issues an instruction by touching a touch panel in accordance with the contact position, physical coordinate data is output. It is determined whether or not logical coordinate data obtained by coordinate transformation of the physical coordinate data based on new reference positional data lies inside an allowable range. When it is determined that the logical coordinate data lies outside the allowable range, calibration is performed again.

According to the method described in Japanese Laid-Open Patent Publication (Kokai) No. H10-116155, calibration results are checked, but when a user makes an error in calibrating operation, it is extremely difficult to know when the error occurred. Also, according to Japanese Laid-Open Patent Publication (Kokai) No. H10-116155, it is necessary to perform calibration again from the beginning.

On the other hand, there has been known a method that limits an area where touch input is allowed, and determines that touch input outside the area is ineffective during touch input for calibration. According to this method, touch input determined to be ineffective is not used for calibration, and this can prevent user's erroneous operations.

According to the above method, an area where touch input is allowed is limited to a range of coordinate deviation assumed to occur in normal use (a limited range) before product shipment. Thus, touch input assumed to deviate from target coordinates of calibration caused by a user's erroneous operation, not by an error resulting from a coordinate deviation, can be excluded.

However, a coordinate deviation beyond the limited range of coordinate deviation assumed to occur in normal use may occur in a hostile environment such as exposure to high temperature for a long time (hereafter referred to as an extreme environment). In such cases, even when a user performs a normal calibrating operation, this cannot be recognized as touch input inside the limited range.

Thus, when a coordinate deviation beyond the limited range occurs, it is possible that calibration cannot be performed even when a user performs a normal calibrating operation (that is, even when a user makes no error).

SUMMARY OF THE INVENTION

The present invention provides a display control apparatus and a display control method, which can prevent calibration caused by a user's erroneous operation in normal use, and correct for a coordinate deviation beyond the scope of assumption, and a computer-readable storage medium storing a program for causing a computer to execute the method.

Accordingly, a first aspect of the present invention provides a display control apparatus that performs calibration to correct for a coordinate deviation between detected coordinates, which are coordinates corresponding to touch input to target coordinates defined in advance, and the target coordinates, comprising a detected coordinate obtainment unit configured to perform transformation of the touch input to obtain the detected coordinates using a transformation coefficient for transforming the touch input into coordinates on a display unit, a first calibration coordinate obtainment unit configured to, when the detected coordinates are obtained inside a first range defined in advance using the target coordinates as a base point, obtain the detected coordinates as calibration coordinates for use in calibration, a second calibration coordinate obtainment unit configured to, when the detected coordinate obtainment unit obtains the detected coordinates outside the first range, obtain a relationship between the detected coordinates obtained this time and the detected coordinates obtained last time, and determine whether the obtained relationship satisfies a specific condition determined in advance, and when the number of times it is determined that the specific condition is satisfied becomes equal to a predetermined number of times, obtain a plurality of detected coordinates obtained outside the first range as calibration coordinates for use in calibration, and a calibration unit configured to perform a calibration process to update the transformation coefficient based on the calibration coordinates obtained by the first calibration coordinate obtainment unit and/or the second calibration coordinate obtainment unit.

Accordingly, a second aspect of the present invention provides a display control method that performs calibration to correct for a coordinate deviation between detected coordinates, which are coordinates corresponding to touch input to target coordinates defined in advance, and the target coordinates, comprising a first step of performing transformation of the touch input to obtain the detected coordinates using a transformation coefficient for transforming the touch input into coordinates on a display unit, a second step of, when the detected coordinates are obtained inside a first range defined in advance using the target coordinates as a base point, obtaining the detected coordinates as calibration coordinates for use in calibration, a third step of, when the detected coordinates are obtained outside the first range, obtaining a relationship between the detected coordinates obtained this time and the detected coordinates obtained last time, and determine whether the obtained relationship satisfies a specific condition determined in advance, and when the number of times it is determined that the specific condition is satisfied becomes equal to a predetermined number of times, obtaining a plurality of detected coordinates obtained outside the first range as calibration coordinates for use in calibration, and a fourth step of performing a calibration process to update the transformation coefficient based on the calibration coordinates obtained by the second step and/or the third step.

Accordingly, a third aspect of the present invention provides a computer-readable non-transitory storage medium storing a program for causing a computer to execute a display control method that performs calibration to correct for a coordinate deviation between detected coordinates, which are coordinates corresponding to touch input to target coordinates defined in advance, and the target coordinates, the display control method comprising a first step of performing transformation of the touch input to obtain the detected coordinates using a transformation coefficient for transforming the touch input into coordinates on a display unit, a second step of, when the detected coordinates are obtained inside a first range defined in advance using the target coordinates as a base point, obtaining the detected coordinates as calibration coordinates for use in calibration, a third step of, when the detected coordinates are obtained outside the first range, obtaining a relationship between the detected coordinates obtained this time and the detected coordinates obtained last time, and determine whether the obtained relationship satisfies a specific condition determined in advance, and when the number of times it is determined that the specific condition is satisfied becomes equal to a predetermined number of times, obtaining a plurality of detected coordinates obtained outside the first range as calibration coordinates for use in calibration, and a fourth step of performing a calibration process to update the transformation coefficient based on the calibration coordinates obtained by the second step and/or the third step.

According to the present invention, even when detected coordinates are obtained outside the first range, the detected coordinates are regarded as calibration coordinates for use in calibration when the relationship between detected coordinates satisfies the predetermined specific condition, and the number of times the specific condition is satisfied reaches a predetermined number of times. As a result, incorrect calibration caused by a user's erroneous operation in normal use can be prevented, and a coordinate deviation beyond the scope of assumption in an extreme environment can be corrected for in an appropriate manner.

Further features of the present invention will become apparent from the following description of exemplary embodiments (with reference to the attached drawings).

BRIEF DESCRIPTION OF THE DRAWINGS

FIGS. 3A to 3C are diagrams showing screen transition useful in explaining calibration by a system control circuit shown in FIG. 1, in which FIG. 3A is a diagram showing a calibration screen, FIG. 3B is a diagram showing a screen in a case where effective area input has been done, and FIG. 3C is a diagram showing a screen in a case where ineffective area input has been done.

DESCRIPTION OF THE EMBODIMENTS

A description will now be given of an exemplary display control apparatus according to an embodiment of the present invention with reference to the drawings. In the following description, it is assumed that the display control apparatus is provided in, for example, a digital camera which is one of electronic devices.

Figure 1:
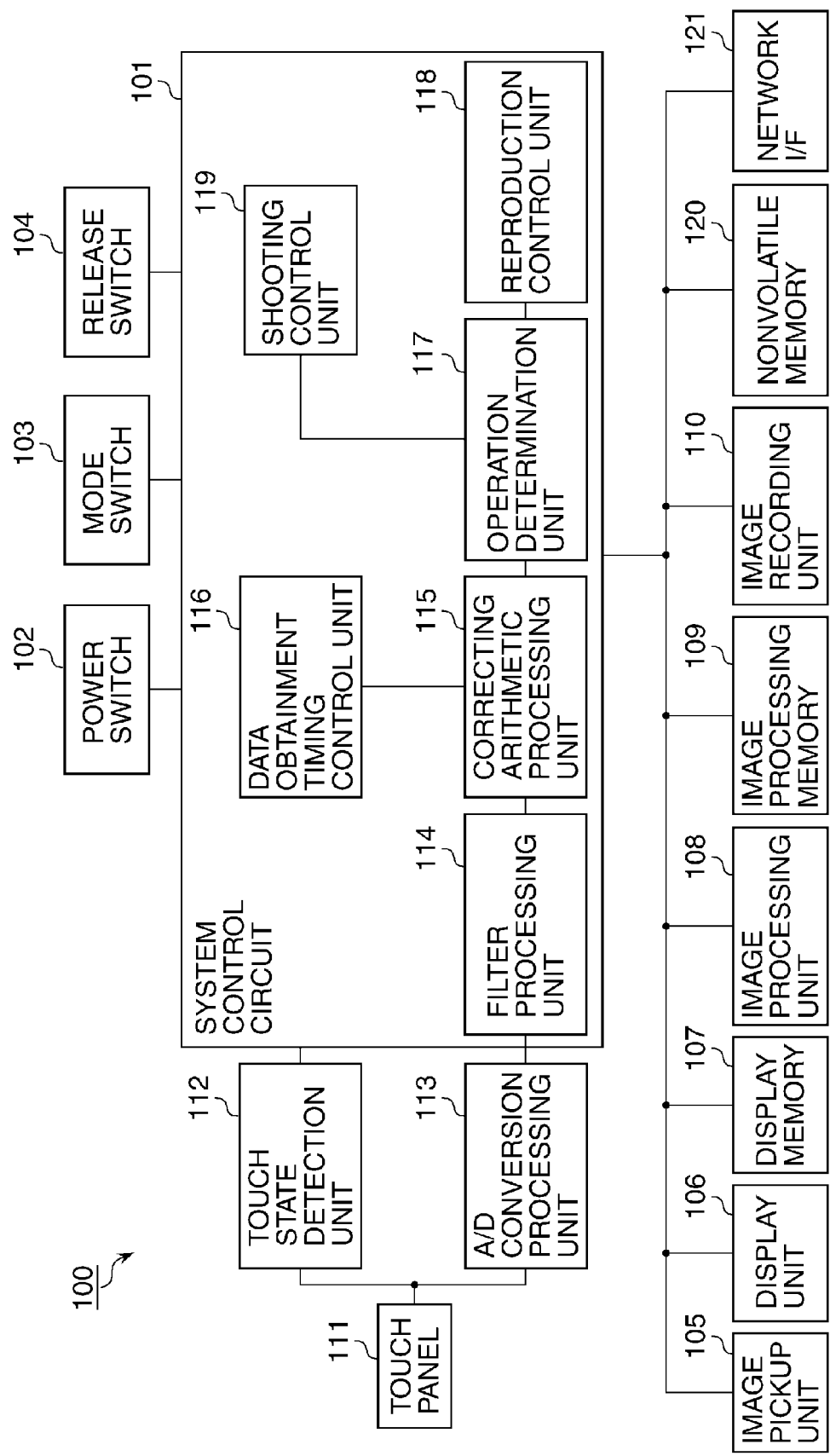
FIG. 1 is a block diagram showing an exemplary digital camera provided with an exemplary display control apparatus according to an embodiment of the present invention.

FIG. 1 is a block diagram showing an exemplary digital camera 100 provided with the exemplary display control apparatus according to the embodiment of the present invention.

Referring to FIG. 1, the digital camera 100 has a system control circuit 101. A power switch 102, a mode switch 103, and a release switch 104 are connected to the system control circuit 101. The system control circuit 101 is further connected to a touch panel 111 via a touch state detection unit 112 and an A/D conversion processing unit 113.

It should be noted that in the illustrated example, the system control circuit 101 acts as the display control apparatus as described later.

The digital camera 100 also has an image pickup unit 105, a display unit 106, a display memory 107, an image processing unit 108, an image processing memory (work memory) 109, an image recording unit 110, a nonvolatile memory 120, and a network interface (I/F) 121.

The image pickup unit 105, the display unit 106, the display memory 107, the image processing unit 108, the image processing memory 109, the image recording unit 110, the nonvolatile memory 120, and the network I/F 121 are controlled by the system control circuit 101.

The system control circuit 101 executes programs, which are recorded in the nonvolatile memory 120, a removable nonvolatile memory (not shown), or the like, using the image processing memory 109 to carry out various processes, described later.

The system control circuit 101 can also execute programs on a network (not shown) via the network I/F 121.

The power switch 102 turns on and off power supply to the digital camera 100. The mode switch 103 switches between a shooting mode and a reproduction mode.

In the shooting mode, the image pickup unit 105 picks up a subject or the like. The image pickup unit 105 has an image pickup device such as a CCD (charge-coupled device), and an optical image formed on the image pickup device is output as an electric signal from the image pickup device. Then, the image pickup unit 105 performs analog-to-digital conversion of the electric signal, and outputs the resultant signal as a digital signal (image pickup signal).

The image pickup signal is subjected to a developing process by the image processing unit 108, and temporarily stored as display image data (display image pickup data) in the display memory 107. The display image data is displayed as an image on the display unit 106 such as an LCD (liquid crystal display).

In the shooting mode, when an instruction to record an image pickup signal is issued via the release switch 104, the system control circuit 101 controls the image processing unit 108 to perform image processing on the image pickup signal and record the resultant signal as image data (image pickup data) in the image recording unit 110.

The image processing unit 108 performs image processing such as a compression/decompression process or a development process on an image pickup signal. When performing the image processing, the image processing unit 108 uses the image processing memory 109 as a work memory.

It should be noted that in the reproduction mode, the system control circuit 101 controls the image processing unit 108 to perform image processing on image data recorded in the image recording unit 110 and display the resultant image data as an image on the display unit 106.

Figure 2:
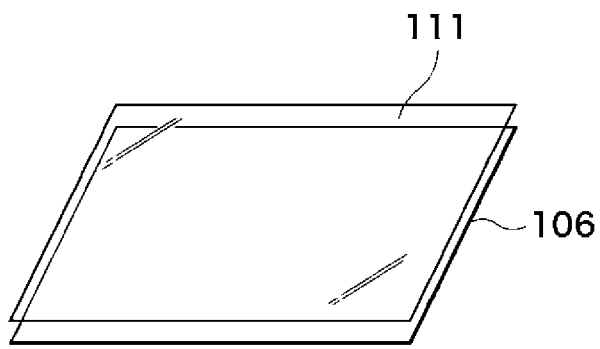
FIG. 2 is a view schematically showing the positional relationship between a touch panel and a display unit (LCD) shown in FIG. 1.

FIG. 2 is a view schematically showing the positional relationship between the touch panel 111 and the display unit (LCD) 106 shown in FIG. 1.

Referring to FIG. 2, the touch panel 111 is overlaid on the display unit 106. Namely, the touch panel 111 is placed on a surface of the display unit 106. When a user does touch input to the touch panel 111, a touch input signal indicative of the touch input is output as an analog signal from the touch panel 111.

The illustrated touch panel 111 is, for example, a touch panel of a resistive film type. In addition to a touch panel of a resistive film type, touch panels of various types such as a capacitance type and an optical type may be used.

Referring again to FIG. 1, the touch state detection unit 112 detects a touch state indicative of whether or not the user is touching the touch panel 111, and outputs a touch state detection signal. In a state where the user is touching the touch panel 111 with a finger or a pen (hereafter referred to as a touched state), the touch state detection unit 112 outputs a touch state detection signal indicative of ON.

On the other hand, in a state where the user has moved the finger or the like off the touch panel, that is, a state where nothing is touching the touch panel 111 (hereafter referred to as an untouched state), the touch state detection unit 112 outputs a touch state detection signal indicative of "OFF". Then, the touch state detection signal is given to the system control circuit 101.

The above described analog signal (touch input signal) is given to and converted into a digital signal by the A/D conversion processing unit 113 (hereafter, a touch input signal converted into a digital signal will also be referred to merely as a touch input signal).

The system control circuit 101 is a circuit that controls various processes in the digital camera 100, but in FIG. 1, only functions related to touch input on the touch panel 111 are illustrated as a functional block.

Here, the system control circuit 101 acts as a display control apparatus, and serves as a detected coordinate obtainment unit, a first calibration coordinate obtainment unit, a second calibration coordinate obtainment unit, and a calibration unit.

In the illustrated example, the system control circuit 101 has a filter processing unit 114, a correction arithmetic processing unit 115, a data obtainment timing control unit 116, an operation judgment unit 117, a reproduction control unit 118, and a shooting control unit 119.

The above described touch input signal is given to the filter processing unit 114. The filter processing unit 114 performs a filtering process such as a median/mean filtering process on the touch input signal, and outputs the filtered signal.

This filtered signal is given to the correction arithmetic processing unit 115. In accordance with the filtered signal, the correction arithmetic processing unit 115 generates a coordinate signal (coordinate data) indicative of a touch input position (coordinates).

Further, the correction arithmetic processing unit 115 corrects for a deviation in coordinate data resulting from age deterioration or the like based on an execution result of a calibrating function, described later, to produce corrected coordinate data. The corrected coordinate data is given to the operation determination unit 117.

Incidentally, in accordance with a coordinate obtainment cycle (coordinate sampling cycle) determined in advance, the data obtainment timing control unit 116 gives a coordinate obtainment timing signal indicative of coordinate obtainment timing to the correction arithmetic processing unit 115.

In response to the coordinate obtainment timing signal, the correction arithmetic processing unit 115 sends out a coordinate obtainment request signal, which instructs obtainment of coordinate data, that is, the touch input signal, to the filter processing unit 114.

In response to the coordinate obtainment request signal, the filter processing unit 114 starts operation of the A/D conversion processing unit 113. The A/D conversion processing unit 113 performs analog-to-digital conversion on the touch input signal a number of times required for a filtering process, and thereafter, stops operating.

The above described operation determination unit 117 determines a type of the user's input operation based on the corrected coordinate data as described later, and outputs an input operation determination signal. The input operation determination signal is given to the reproduction control unit 118 and the shooting control unit 119.

In response to the input operation determination signal, the reproduction control unit 118 provides control in the above described reproduction mode. Also, in response to the input operation determination signal, the shooting control unit 119 provides control in the above described shooting mode.

A description will now be given of calibration of coordinate data performed by the system control circuit 101. Here, a description will be given of an example where a coordinate correction coefficient is calculated from coordinate data at four points.

FIGS. 3A to 3C are diagrams showing screen transition useful in explaining calibration performed by the system control circuit 101 shown in FIG. 1, in which FIG. 3A is a diagram showing a calibration screen, FIG. 3B is a diagram showing a screen in a case where effective area (also referred to as a first range and a first area) input has been done, and FIG. 3C is a diagram showing a screen in a case where ineffective area input has been done.

Referring to FIGS. 1 and 3A to 3C, to perform calibration, the system control circuit 101 displays a calibration screen on the display unit 106. On the calibration screen, a depression target mark (for example, a cross mark) 301 is displayed at coordinates predetermined in advance (referred to as target coordinates) (see FIG. 3A).

Further, on the calibration screen shown in FIG. 3A, a message saying that "Please touch+in sequence" is displayed to prompt the user to touch the depression target mark 301, and a cancel button 302 is displayed under the message.

When the user touches the cancel button 302, calibration is canceled.

On the other hand, when the user touches the depression target mark 301 on the calibration screen shown in FIG. 3A, a touch state detection signal is given to the system control circuit 101 as described above. When the touch state detection signal is indicative of ON, and the touch input is inside an effective range determined in advance based on the target coordinates (effective area input), the system control circuit 101 obtains the touch input in the above described manner.

Then, the system control circuit 101 displays the screen shown in FIG. 3B on the display unit 106. On this screen, the depression target mark 301 represented by the cross has been shifted.

On the other hand, when touch input is done outside the effective range (ineffective area input), the system control circuit 101 displays the screen shown in FIG. 3C on the display unit 106. On this screen, the depression target mark 301 represented by the cross has not been shifted, but a message saying that "Please touch again" is newly displayed.

On the screen shown in FIG. 3B, when effective area input is done, the system control circuit 101 displays, on the display unit 106, a screen on which the depression target mark 301 represented by the cross has been shifted.

Also, on the screen shown in FIG. 3C, when effective area input is done, the system control circuit 101 displays, on the display unit 106, a screen on which the depression target mark 301 represent by the cross has been shifted.

In the above described manner, the system control circuit 101 obtains coordinate data on effective area input, and continues the process until it obtains coordinate data at a total of four points.

Figure 4:
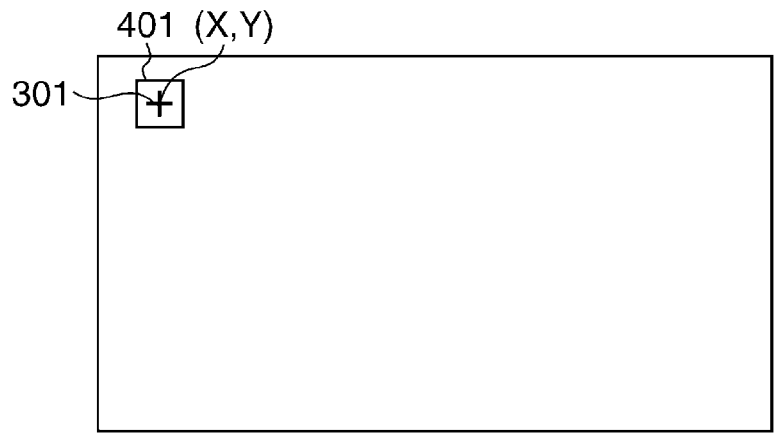
FIG. 4 is a view showing the relationship between target coordinates and an effective range of touch input shown in FIGS. 3A to 3C.

FIG. 4 is a view showing the relationship between the target coordinates and the effective range of touch input shown in FIGS. 3A to 3C. As shown in FIG. 4, the target coordinates are represented by coordinates (X, Y) here. The system control circuit 101 displays the cross-shaped depression target mark 301 on the display unit 106 (FIG. 1) such that the coordinates (X, Y) are located at a center (intersection point) of the cross.

On this occasion, the effective range is set as an effective area (also referred to as a first range or a first area) 401 using the coordinates (X, Y) as a reference (base point). The effective area 401 is not displayed on the display unit 106. It should be noted that the effective area 401 is set in advance with consideration given to an amount of coordinate deviation generally assumed to occur in normal use before product shipment.

In the above described manner, first, when effective area input is done on the depression target mark 301 at the first point, the system control circuit 101 obtains coordinate data corresponding to the effective area input as first detected coordinate data. Likewise, when effective area input is done on the depression target mark 301 at the second point, the system control circuit 101 obtains coordinate data corresponding to the effective area input as second detected coordinate data.

After obtaining a predetermined number (here, a predetermined number is 4) of pieces of detected coordinate data (that is, first to fourth detected coordinate data) in the above described manner, the system control circuit 101, and then carries out a process to calculate a coordinate transformation coefficient.

Figure 5:
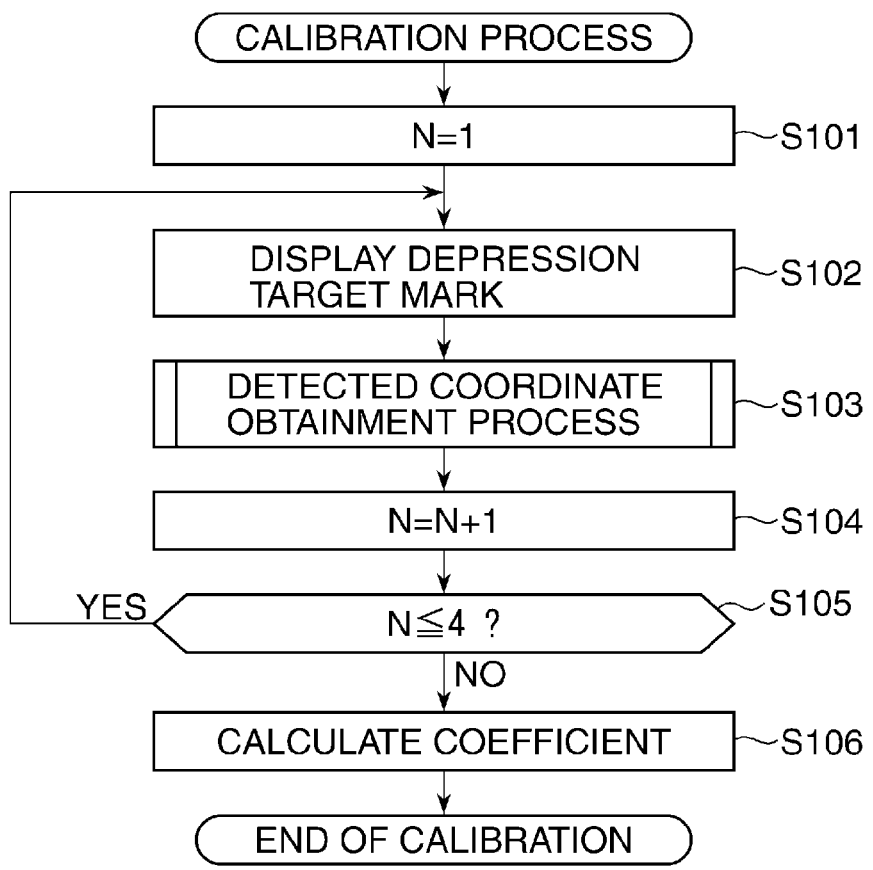
FIG. 5 is a flowchart useful in explaining calibration (a process to calculate a coordinate transformation coefficient) performed by the system control circuit shown in FIG. 1.

FIG. 5 is a flowchart useful in explaining calibration (a process to calculate a coordinate transformation coefficient) performed by the system control circuit 101 shown in FIG. 1.

Referring to FIGS. 1 and 5, the system control circuit 101 performs calibration in accordance with a program recorded in the nonvolatile memory 20 or a removable nonvolatile memory (not shown).

Upon receiving a calibration start instruction through a user's operation or the like, the system control circuit 101 sets a target coordinate counter N (not shown) incorporated therein at 1 (step S101). Then, for target coordinates [N], the system control circuit 101 displays the depression target mark 301 on the display unit 106 as described earlier with reference to FIGS. 3A to 3C (step S102). Here, to display the depression target mark 301 on the display unit 106, the system control circuit 101 writes image data in the display memory 7.

Then, when effective area input is done in relation to the target coordinates [N], the system control circuit 101 obtains the Nth detected coordinate data in response to the effective area input (a detected coordinate obtainment process: step S103). It should be noted that the detected coordinate obtainment process carried out in the step S103 will be described later in detail.

After obtaining the Nth detected coordinate data in relation to the target coordinates [N], the system control circuit 101 increments the target coordinate counter N so as to obtain detected coordinate data in relation to the next target coordinates (step S104).

Then, the system control circuit 101 determines whether or not the value of the target coordinate counter N is a predetermined value (in the present example, 4) or less (step S105). When the value of the target coordinate counter N is 4 or less (YES in the step S105), the system control circuit 101 proceeds to the step S102, in which it obtains the (N+1)th coordinate data in relation to target coordinates [N+1].

On the other hand, when the value of the target coordinate counter N is greater than 4 (NO in the step S105), the system control circuit 101 determines that detected coordinate data in relation to all the target coordinates has been obtained (that is, the first to fourth detected coordinate data has been obtained).

Then, the system control circuit 101 calculates a transformation coefficient according to the first to fourth detected coordinate data (calibration coordinates) (calculation of a transformation coefficient: step S106), and completes the calibration. Namely, to transform the first to fourth detected coordinates represented by the first to fourth detected coordinate data into target coordinates, the system control circuit 101 calculates a transformation coefficient by performing geometric transformation (that is, update a transformation coefficient by performing calibration). Then, the system control circuit 101 stores the transformation coefficient in main memory or the like.

Figure 6:
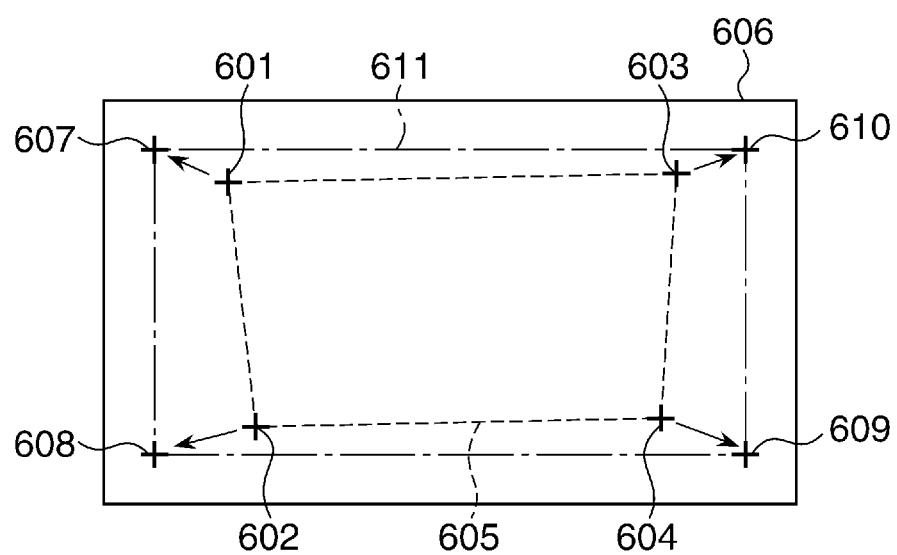
FIG. 6 is a view useful in explaining the calculation of a transformation coefficient described with reference to FIG. 5.

FIG. 6 is a view useful in explaining the calculation of a transformation coefficient described with reference to FIG. 5. Referring to FIG. 6, to calculate a transformation coefficient, the system control circuit 101 forms a rectangle 605, of which vertices are at the first to fourth detected coordinates 601 to 604, on a display region 606.

Further, the system control circuit 101 forms a rectangle 611, of which vertices are at the first to fourth target coordinates 607 to 610 respectively corresponding the first to fourth detected coordinates 601 to 604, on the display region 606.

Then, in accordance with the rectangle 605 and the rectangle 611, the system control circuit 101 calculates a coefficient of a geometric transform equation for transforming the rectangle 605 into the rectangle 611 as a transformation coefficient.

Figure 7A:
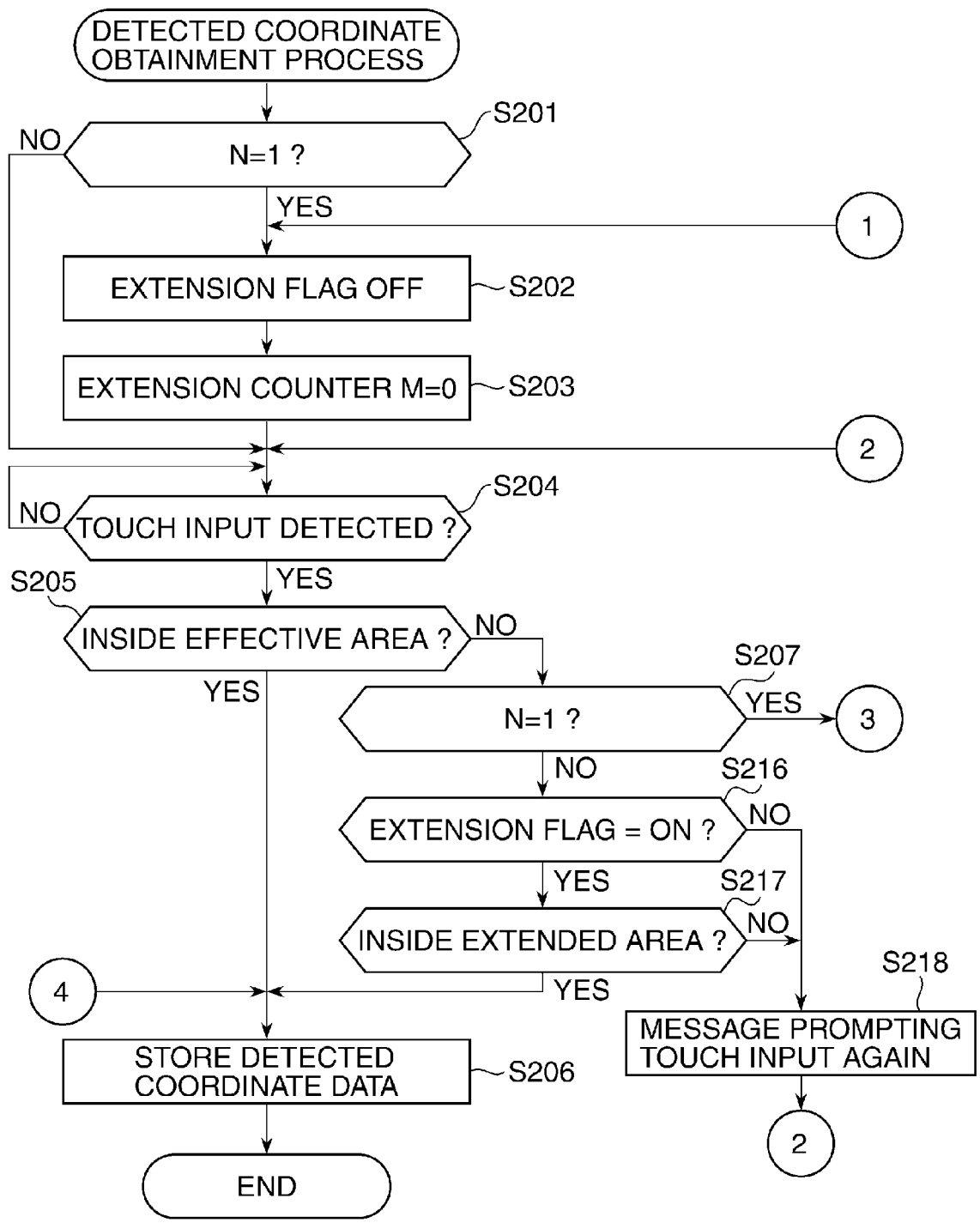
FIG. 7A is a flowchart useful for explaining in detail a detected coordinate obtainment process in FIG. 5.
Figure 7B:
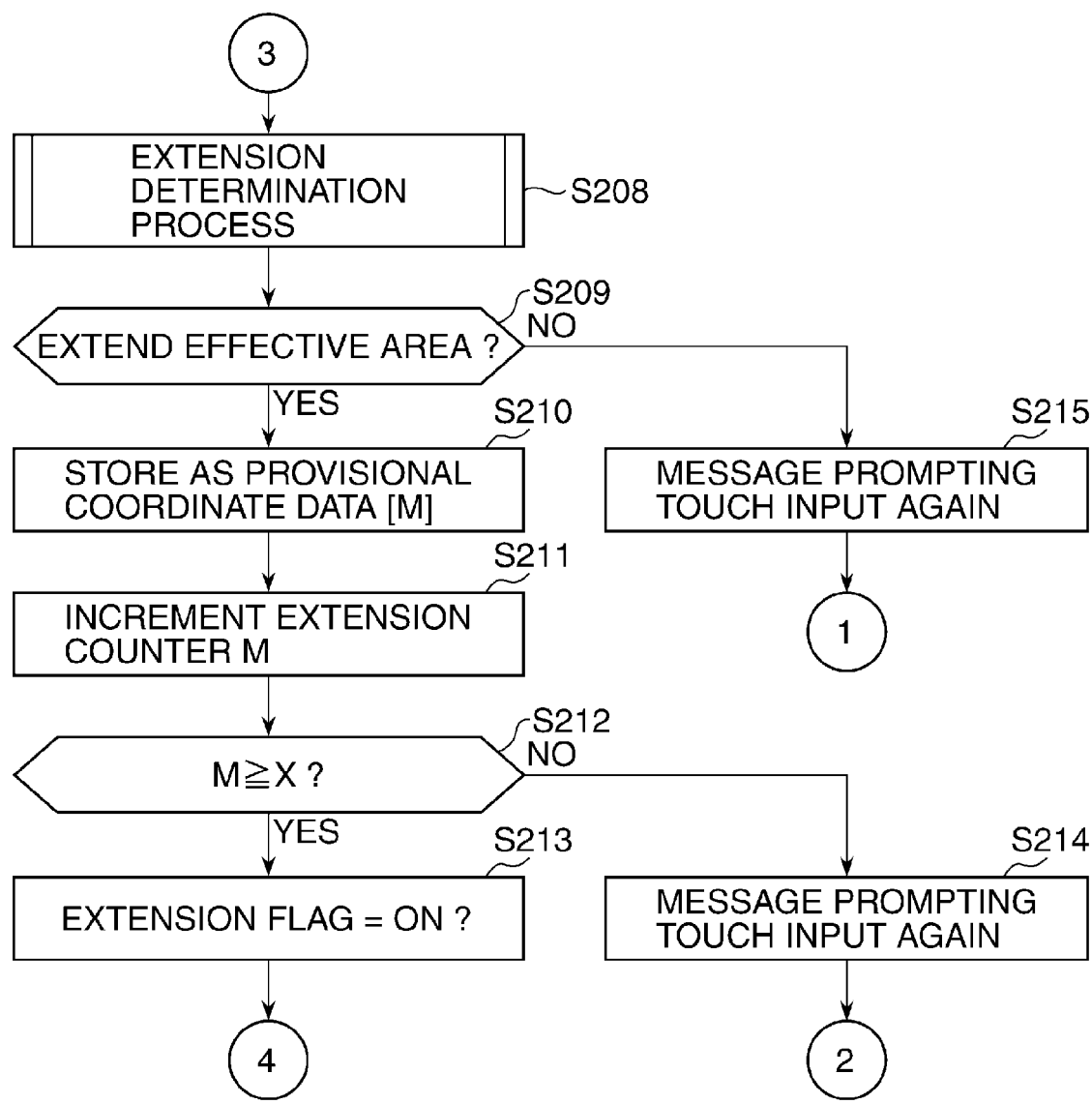
FIG. 7B is a flowchart useful for explaining in detail the detected coordinate obtainment process in FIG. 5.

FIGS. 7A and 7B are flowcharts useful for explaining in detail the detected coordinate obtainment process in FIG. 5.

Referring to FIGS. 1, 7A, and 7B, in the detected coordinate obtainment process, first, the system control circuit 101 determines whether or not target coordinate data that should be obtained now is the first target coordinate data. Namely, the system control circuit 101 determines whether or not N=1 (step S201).

When target coordinate data that should be obtained now is the first target coordinate data (YES in the step S201), the system control circuit 101 resets an extension flag stored in the work memory 109 (hereafter referred to as initialization: step S202).

Then, the system control circuit 101 sets an extension counter M stored in the work memory 109 at 0 (hereafter referred to as initialization: step S203). Then, the system control circuit 101 determines whether or not touch input has been done on the touch panel 111, that is, whether or not touch input has been detected by the touch state detection unit 112 (step S204). When touch input has not been detected (NO in the step S204), the system control circuit 101 stands by (that is, the system control circuit 101 waits until touch input is detected).

On the other hand, when touch input has been detected (YES in the step S204), the system control circuit 101 transforms a touch input position (touch coordinate position) obtained in the above described manner according to the transformation coefficient to obtain detected coordinate data. It should be noted that when target coordinate data that should be obtained now is not the first target coordinate data (NO in the step S201), the system control circuit 101 proceeds to the step S204.

Then, the system control circuit 101 determines whether or not detected coordinates represented by the above described detected coordinate data are inside an effective area (step S205). When the detected coordinates are inside the effective area (YES in the step S205), the system control circuit 101 regards the detected coordinate data as effective detected coordinate data with respect to target coordinates [N]. Then, the system control circuit 101 stores the detected coordinate data (calibration coordinates) in the work memory 109 (step S206), and terminates the process.

On the other hand, when the detected coordinates are not inside the effective area (NO in the step S205), the system control circuit 101 determines whether or not detected coordinate data that should be obtained now is related to the first target coordinates (that is, whether or not N=1) (step S207).

When N=1 (YES in the step S207), the system control circuit 101 carries out an extension determination process to determine whether or not to accept detected coordinate data outside the effective area as well (step S208). The extension determination process in the step S208 will be described later in detail.

Then, based on a result of the extension determination process, the system control circuit 101 determines whether or not to extend the effective area (step S209). Namely, the system control circuit 101 determines whether or not the extension determination process is OK. When determining to extend the effective area (YES in the step S209), the system control circuit 101 stores the above described detected coordinate data as provisional coordinate data [M] in the work memory 109 (step S210).

Then, the system control circuit 101 increments the extension counter M (step S211). A predetermined number X to be used as a threshold value is set in advance in the system control circuit 101. The predetermined number X is a threshold value for determining whether or not detected coordinate data obtained in an extended effective area will be determined to be effective.

Figure 8:
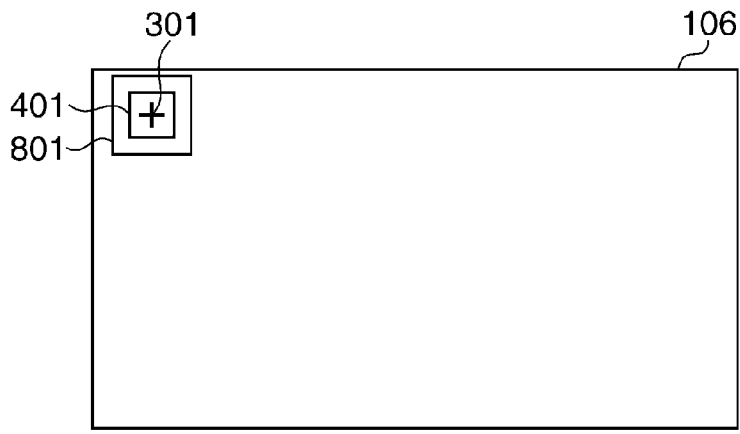
FIG. 8 is a view showing the relationship between an effective area (normal effective area) and an extended effective area described with reference to FIG. 4.

FIG. 8 is a view showing the relationship between the effective area (normal effective area) 401 described with reference to FIG. 4 and an extended effective area 801.

As shown in FIG. 8, the extended effective area 801 (also referred to as a second range or a second area) has a broader range than the effective area 401. The extended effective area 801 is an area that is set in advance as a range of coordinate deviation generally assumed to occur in extreme environments which are not normal environments.

In the illustrated example, the extended effective area 801 is set so as to enclose the effective area 401, and is adjacent to the effective area 401. The size of the extended effective area 801 is not limited as long as it is broader than the effective area 401. For example, the entire display region of the display unit 106 may be an extended effective area.

However, in a case where target coordinates (that is, the depression target mark 301) are correctly touched, touch input caused by a user's erroneous operation can be excluded even in an extreme environment if a range except for a range that could not be detected only under the influence of detection deviation is set as an extended effective area.

Referring again to FIGS. 1, 7A, and 7B, the system control circuit 101 determines whether or not the value of the extension counter M is equal to or more than the predetermined value X (step S212). It should be noted that in the illustrated example, it is assumed that the predetermined value X is 3.

When the value of the extension counter M is equal to or more than the predetermined value X (YES in the step S212), this means that touch input has been detected outside the effective area sequentially a number of times corresponding to the predetermined value X. Namely, in the extension determination process, it is determined that the effective area is to be extended.

Then, the system control circuit 101 sets the extension flag (step S213), and proceeds to the step S206. In this case, as effective detected coordinate data related to the target coordinates [N], any of the provisional coordinate data [M], an average of the provisional coordinate data [M], or the like is stored as calibration coordinates in the work memory 109.

It should be noted that the extension flag is a flag indicative of whether or not an area in which detected coordinate data is effective is extended from an effective area to an extended effective area.

When in the step S212, the value of the extension counter M is less than the predetermined value X (NO in the step S212), the system control circuit 101 displays on the display unit 106 a message prompting the user to do touch input again (step S214). Then, the system control circuit 101 returns to the step S204.

When it is determined in the step S209 that the effective area is not to be extended (NO in the step S209), the system control circuit 101 displays on the display unit 106 a message prompting the user to do touch input again (step S215). Then, the system control circuit 101 returns to the step S202, in which it obtains effective detected coordinate data related to the target coordinates [N] again.

When N is not equal to 1 in the step S207 (NO in the step S207), the system control circuit 101 determines whether or not the extension flag is ON (step S216). When the extension flag is ON (YES in the step S216), the system control circuit 101 determines whether or not detected coordinates represented by the detected coordinate data lie inside the extended effective area (step S217).

When the detected coordinates lie inside the extended effective area (YES in the step S217), the system control circuit 101 proceeds to the step S206. In this case, the system control circuit 101 stores the detected coordinate data in the work memory 109, and terminates the process.

On the other hand, when the detected coordinates do not lie inside the extended effective area (NO in the step S217), the system control circuit 101 displays on the display unit 106 a message prompting the user to do touch input again (step S218). Then, the system control circuit 101 returns to the step S204, in which it obtains effective detected coordinate data related to the target coordinates [N] again.

When the extension flag is not ON (NO in the step S216), the system control circuit 101 proceeds to the step S218, in which it displays on the display unit 106 a message prompting the user to do touch input again.

Figure 9:
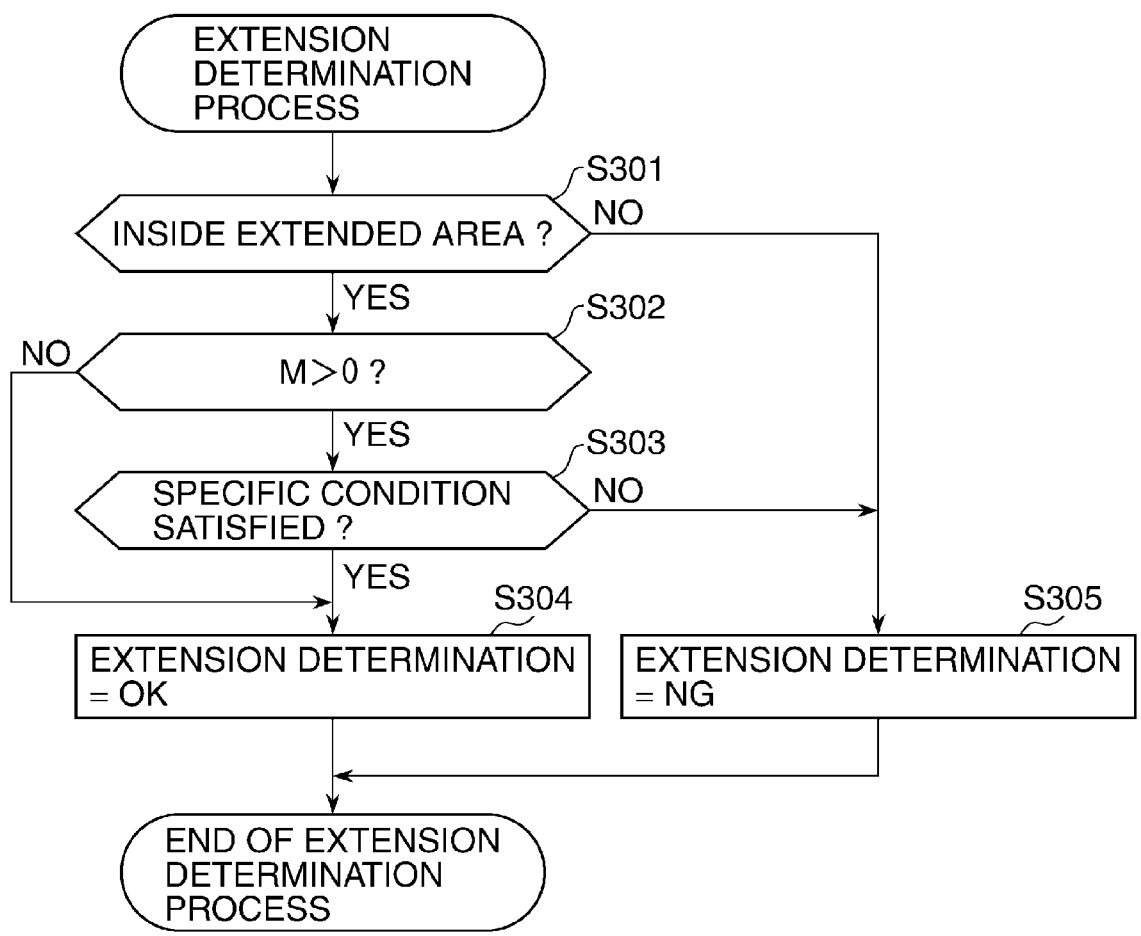
FIG. 9 is a flowchart useful in explaining an extension determination process in FIG. 7B.

FIG. 9 is a flowchart useful for explaining in detail the extension determination process in FIG. 7B.

Referring to FIGS. 1 and 9, in the extension determination process, first, the system control circuit 101 determines whether or not detected coordinates represented by the detected coordinate data lie inside the extended effective area (step S301).

When the detected coordinates lie inside the extended effective area (YES in the step S301), the system control circuit 101 refers to the extension counter M to determine whether or not the value of the extension counter M is greater than 0 (step S302).

When the value of the extension counter M is greater than 0 (YES in the step S302), the system control circuit 101 determines whether or not the relationship between the detected coordinate data and the provisional coordinate data (that is, the previous detected coordinate data) satisfies a predetermined condition (specific condition) (step S303).

In the illustrated example, the predetermined condition (specific condition) is that an angle θ formed by a vector from the target coordinates [N] to the provisional coordinates (a first vector) and a vector from the target coordinates [N] to the detected coordinates (a second vector) is equal to or smaller than a predetermined angle (or equal to or smaller than a predetermined angle R).

Figure 10:
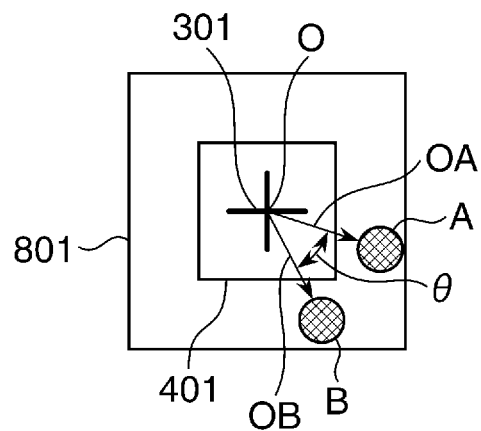
FIG. 10 is a diagram useful in explaining a first exemplary determination as to whether or not a predetermined condition shown in FIG. 9 is satisfied.

FIG. 10 is a diagram useful in explaining a first exemplary determination as to whether or not the predetermined condition shown in FIG. 9 is satisfied. As shown in FIG. 10, the target coordinates are designated by a character "O", and the provisional coordinates are designated by a character "A". Also, the detected coordinates are designated by a character "B". On this occasion, the system control circuit 101 determines whether or not the angle θ formed by the first vector OA and the second vector OB is equal to or smaller than the angle R.

Referring again to FIGS. 1 and 9, when the angle θ is equal to or smaller than the angle R (YES in the step S303), the system control circuit 101 determines that the extension determination is OK (step S304), and terminates the extension determination process.

On the other hand, when the angle θ is greater than the angle R (NO in the step S303), the system control circuit 101 determines that the extension determination is NG (step S305), and terminates the extension determination process.

It should be noted that in the step S301, when the detected coordinates lie outside the extended effective area (NO in the step S301), the system control circuit 101 proceeds to the step S305, in which it determines that the extension determination is NG, and terminates the extension determination process. Moreover, when in the step S302, the value of the extension counter M is 0 (NO in the step S302), the system control circuit 101 proceeds to the step S304, in which it determines that the extension determination is OK, and terminates the extension determination process.

When the angle θ is equal to or smaller than the angle R, this means that the present touch input has been detected in the same direction as the direction in which the previous touch input was detected outside the effective area and inside the extended effective area. In this case, it is highly possible that the user has intentionally done touch input at the same position.

In such cases, it is possible that the reason why the position of the touch input was outside the effective area is not that the user made an error, but that the detected coordinates detected in an extreme environment greatly deviate from the display position on the display unit 106.

Namely, it is possible that the position of the depression target mark 301 displayed on the display unit 106 has been correctly and repeatedly depressed. Thus, in order that the detected coordinates outside the effective area can be effective, the system control circuit 101 determines that the extension determination is OK as described above.

As described above, it is assumed that the display position on the display unit 106 and the detected position on the touch panel 111 deviate from each other (coordinate deviation). On this occasion, even when the user touches the position of the depression target mark 301 displayed on the display unit 106, it is not determined that detected coordinates are effective due to the coordinate deviation. Then, the user is prompted to do touch input again.

However, even when the user correctly touches the position of the depression target mark 301 again, the same position (detected coordinates) outside the effective area is detected as in the case of the first touch input. Thus, in the above described example, the system control circuit 101 determines that the extension determination is OK in such cases.

When such a state continues, and the value of the extension counter M reaches the predetermined value X, the extension flag is set. As a result, touch input at positions that have not been regarded as being effective is made effective, and the detected coordinates are stored in the work memory 109 so as to be used for calibration. Namely, the detected coordinates are obtained outside the effective area. In this case, when the relationship between the detected coordinates satisfies the specific condition, and the number of times the specific condition has been satisfied becomes equal to a predetermined number of times, the system control circuit 101 stores the detected coordinates as calibration coordinates in the work memory 109.

In general, touch input of which coordinates are detected inside an effective area and outside an extended effective area is excluded because this is regarded as a user's erroneous operation. Thus, calibration can be prevented from being carried out incorrectly due to a user's erroneous operation.

On the other hand, even when detected coordinates greatly deviate from a display position, calibration that accurately corrects for the great coordinate deviation can be performed if the position of the depression target mark 301 is touched several times in a row.

On this occasion, the user does not have to perform a calibrating operation while recognizing the magnitude of environmental change or the magnitude of the coordinate deviation, but the user has only to always try to correctly touch the depression target mark 301, and hence operability is not impaired.

As in the above described example, even in a case where detected coordinate data is obtained outside an effective area, when the relationship between detected coordinate data satisfies the specific condition determined in advance, and the number of times the specific condition is satisfied reaches a predetermined number of times, the detected coordinate data is used as calibration coordinates. This can not only prevent incorrect calibration due to a user's erroneous operation in normal use, but also accurately correct for a coordinate deviation beyond the scope of assumption in extreme environmental conditions.

It should be noted that although in the above described example, the predetermined condition is that the angle $\theta$ formed by the first vector OA and the second vector OB is equal to or smaller than the predetermined angle R, the predetermined condition is not limited to this.

Figure 11:
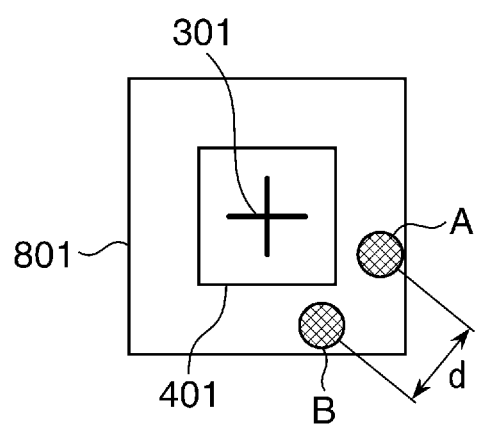
FIG. 11 is a diagram useful in explaining a second exemplary determination as to whether or not the predetermined condition shown in FIG. 9 is satisfied.

FIG. 11 is a diagram useful in explaining a second exemplary determination as to whether or not the predetermined condition shown in FIG. 9 is satisfied. As shown in FIG. 11, a distance d between provisional coordinates A and detected coordinates B may be used as the predetermined condition. In this case, the system control circuit 101 determines whether or not the distance d is equal to or shorter than a distance defined in advance. When the distance d is equal to or shorter than the distance defined in advance, the system control circuit 101 determines that the extension determination is OK.

Figure 12:
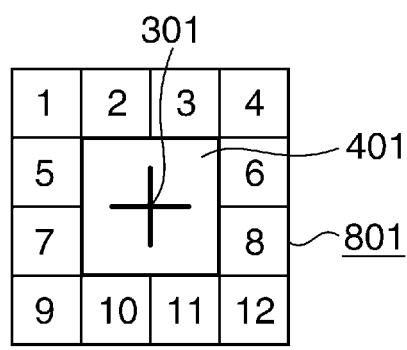
FIG. 12 is a diagram useful in explaining a third exemplary determination as to whether or not the predetermined condition shown in FIG. 9 is satisfied.

FIG. 12 is a diagram useful in explaining a third exemplary determination as to whether or not the predetermined condition shown in FIG. 9 is satisfied. As shown in FIG. 12, the extended effective area 801 located outside the effective area 401 is divided into a plurality of regions. In the illustrated example, the extended effective area 801 is divided into 12 regions to which respective numbers "1" to "12" are assigned.

In this case, the system control circuit 101 determines whether or not the previous touch input and the present touch input are in the same region. When the previous touch input and the present touch input are in the same region, the system control circuit 101 determines that the extension determination is OK.

Incidentally, when the touch panel 111 is of an analog resistive film type, scaling deviations of detected coordinates caused by variations in terminal-to-terminal resistance value mainly occur. Thus, based on a direction in which the first detected coordinates deviate from the first target coordinates, direction in which the first detected coordinates deviate from the first target coordinates can be estimated.

Figure 13:
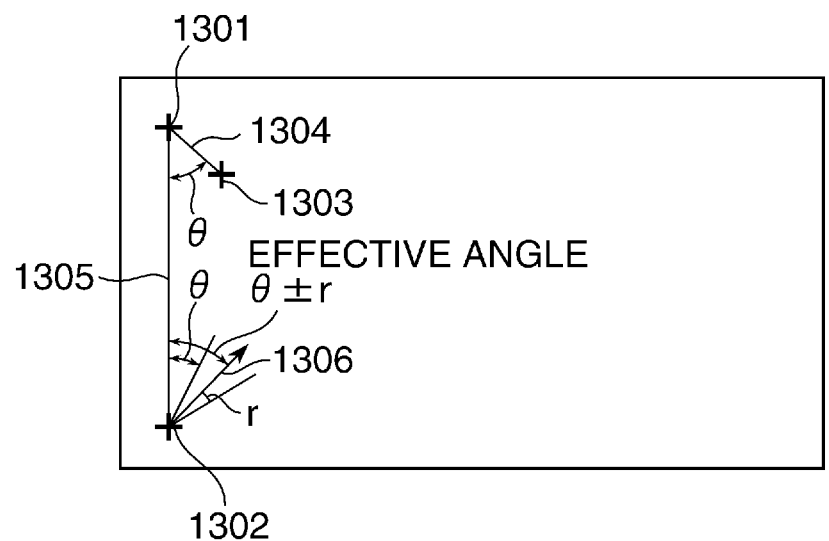
FIG. 13 is a diagram useful in explaining a direction in which detected coordinates deviate from target coordinates in a case where the touch panel shown in FIG. 1 is of an analog resistive film type.

FIG. 13 is a diagram useful in explaining a direction in which detected coordinates deviate from target coordinates in a case where the touch panel 111 shown in FIG. 1 is of an analog resistive film type.

Referring to FIG. 13, the previous target coordinates are designated by a reference numeral 1301, and the present target coordinates are designated by a reference numeral 1302. Detected coordinates related to the target coordinates 1301 are designated by a reference numeral 1303.

A vector from the target coordinates 1301 to the detected coordinates 1303 is designated by a reference numeral 1304, and a vector from the target coordinates 1301 to the target coordinates 1302 is designated by a reference numeral 1305. An angle formed by the vector 1304 and the vector 1305 is designated by $\theta$. When an angle formed by a vector 1306 from the present target coordinates 1302 to detected coordinates related to the target coordinates 1302 and the vector 1305 lies inside a range of $\theta+r$ (r is a predetermined value), the angle is regarded as an effective angle. Thus, touch input for the present target coordinates can be limited in an effective manner.

It should be noted that in general, the above described extreme environment rarely continues. Thus, a transformation coefficient obtained by carrying out calibration using the above described extended effective area is discarded after the calibration is carried out and a predetermined time period has elapsed. After that, a transformation coefficient obtained before the calibration is carried out may be used.

This can save the user from having to carry out calibration again in a normal environment.

As is clear from the above description, the touch state detection unit 112, the AD conversion processing unit 113, and the system control circuit 101 collectively act as a detected coordinate obtainment unit. Also, the system control circuit 101 acts as a first calibration coordinate obtainment unit, a second calibration coordinate obtainment unit, and a calibration unit. The system control circuit 101 acts as a display control unit as well. Further, the system control circuit 101 acts as a storage control unit and a control unit as well.

Moreover, in the display control method, the functions of the detected coordinate obtainment unit, the first calibration coordinate obtainment unit, the second calibration coordinate obtainment unit, and the calibration unit correspond to a first step, a second step, a third step, and a fourth step, respectively.

It should be noted that control of the system control circuit 101 may be exercised by a single piece of hardware, or may be shared by a plurality of pieces of hardware to control the entire apparatus.

Moreover, although in the above described embodiment, the present invention is applied to a digital camera, the present invention is not limited to this. Namely, the present invention may be applied to display control apparatuses such as a personal computer, a PDA, a cellular phone terminal, a portable image viewer, a display for selection and confirmation of print images provided in a printer device, and a digital photo frame as long as they use a touch panel.

Moreover, the display control circuit 101 may be comprised of a computer such as a microcomputer. In this case, the functions of the above described embodiment may be executed as the display control method by the microcomputer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-024021 filed Feb. 5, 2010, which is hereby incorporated by reference herein in its entirety.

What is claimed is:

1. A display control apparatus that performs calibration to correct for a coordinate deviation between detected coordinates, which are coordinates corresponding to touch input to target coordinates defined in advance, and the target coordinates, comprising:
   a detected coordinate obtainment unit configured to perform transformation of the touch input to obtain the detected coordinates using a transformation coefficient for transforming the touch input into coordinates on a display unit;
   a first decision unit configured to, when the detected coordinates are obtained inside a first range defined in advance using the target coordinates as a base point, decide the detected coordinates as calibration coordinates for use in calibration;
   a second decision unit configured to, when said detected coordinate obtainment unit obtains a plurality of detected coordinates outside the first range, obtain a relationship between the plurality of detected coordinates obtained outside the first range, determine whether the obtained relationship satisfies a specific condition determined in advance, and when the number of times of determination in which the specific condition is satisfied becomes equal to a predetermined number of times, and decide the plurality of detected coordinates obtained outside the first range as calibration coordinates for use in calibration; and
   a calibration unit configured to perform a calibration process to update the transformation coefficient based on the calibration coordinates decided by said first decision unit and/or said second decision unit.

2. A display control apparatus according to claim 1, further comprising a display control unit configured to display a depression target mark at a position of the target coordinates on the display unit,
   wherein said first and second decision units decide the calibration coordinates when the depression target mark is displayed on the display unit.

3. A display control apparatus according to claim 1, wherein the specific condition is that an angle formed by vectors directed from the target coordinates toward the plurality of detected coordinates obtained outside the first range is not more than a predetermined angle.

4. A display control apparatus according to claim 1, wherein the specific condition is that a distance between the plurality of detected coordinates obtained outside the first range is not more than a predetermined distance.

5. A display control apparatus according to claim 1, wherein the specific condition is that the plurality of detected coordinates obtained outside the first range lie in any one of a plurality of regions arranged adjacent to and outside the first range.

6. A display control apparatus according to claim 1, wherein when the detected coordinates lie inside a second range defined in advance outside the first range, said second decision unit determines whether the specific condition is satisfied.

7. A display control apparatus according to claim 1, wherein a plurality of target coordinates are defined, and said first and second decision units decide the calibration coordinates with respect to the respective plural target coordinates, and
   said second decision unit decides the detected coordinates as the calibration coordinates in a case where said second decision unit have decided the calibration coordinates with respect to one of the plural target coordinates and the detected coordinates with respect to other target coordinates among the plural target coordinates lie outside the first range, if the detected coordinates with respect to the other target coordinates lie inside a second range defined in advance outside the first range.

8. A display control apparatus according to claim 7, wherein said second decision unit uses, as the specific condition, a relationship among a vector directed from a first target coordinates, which is one of the plurality of target coordinates, to a first detected coordinates for the first target coordinates, an axis connecting the a second target coordinates, which is one of the plurality of target coordinates, to the first target coordinates, and a vector directed from the second target coordinates to a second detected coordinates for the second target coordinates, and based on the relationship, determines whether the detected coordinates for the present target coordinates are to be used as the calibration coordinates.

9. A display control apparatus according to claim 1, further comprising:
   a storage control unit configured to store the calibration coordinates in a storage region; and
   a control unit configured to provide control so that, when a time period determined in advance has elapsed since said calibration unit carried out the calibration process based on the calibration coordinates decided by said second decision unit, said detected coordinate obtainment unit does not use the transformation coefficient obtained using the calibration coordinates.

10. A display control method that performs calibration to correct for a coordinate deviation between detected coordinates, which are coordinates corresponding to touch input to target coordinates defined in advance, and the target coordinates, comprising:
   a first step of performing transformation of the touch input to obtain the detected coordinates using a transformation coefficient for transforming the touch input into coordinates on a display unit;
   a second step of, when the detected coordinates are obtained inside a first range defined in advance using the target coordinates as a base point, deciding the detected coordinates as calibration coordinates for use in calibration;
   a third step of, when a plurality of detected coordinates are obtained outside the first range, obtaining a relationship between the plurality of detected coordinates obtained outside the first range, determine whether the obtained relationship satisfies a specific condition determined in advance, and when the number of times of determination in which the specific condition is satisfied becomes equal to a predetermined number of times, and deciding the plurality of detected coordinates obtained outside the first range as calibration coordinates for use in calibration; and
   a fourth step of performing a calibration process to update the transformation coefficient based on the calibration coordinates decided by said second step and/or said third step.

11. A computer-readable non-transitory storage medium storing a program for causing a computer to execute a display control method that performs calibration to correct for a coordinate deviation between detected coordinates, which are coordinates corresponding to touch input to target coordinates defined in advance, and the target coordinates, the display control method comprising:
- a first step of performing transformation of the touch input to obtain the detected coordinates using a transformation coefficient for transforming the touch input into coordinates on a display unit;
- a second step of, when the detected coordinates are obtained inside a first range defined in advance using the target coordinates as a base point, deciding the detected coordinates as calibration coordinates for use in calibration;
- a third step of, when a plurality of detected coordinates are obtained outside the first range, obtaining a relationship between the plurality of detected coordinates obtained outside the first range, determine whether the obtained relationship satisfies a specific condition determined in advance, and when the number of times of determination in which the specific condition is satisfied becomes equal to a predetermined number of times, and deciding the plurality of detected coordinates obtained outside the first range as calibration coordinates for use in calibration; and
- a fourth step of performing a calibration process to update the transformation coefficient based on the calibration coordinates decided by the second step and/or the third step.

12. A display control apparatus according to claim 1, further comprising a receiving unit configured to, in a case where the obtained detected coordinates lie outside the first range, repeatedly receive other touch inputs with respect to the same target coordinates,
wherein said receiving unit keeps receiving the other touch inputs with respect to the same coordinates until when the detected coordinates are obtained inside the first range or when the number of times of determination in which the specific condition is satisfied becomes equal to the predetermined number of times.

* * * * *